United States Patent [19]

Teramachi

[11] Patent Number: 4,841,796
[45] Date of Patent: Jun. 27, 1989

[54] BALL SCREW HAVING AN AXIALLY EXTENDING BALL DEFLECTOR

[76] Inventor: Hiroshi Teramachi, 34-8, Higashitamagawa 2-chome, Setagaya-ku, Tokyo, Japan

[21] Appl. No.: 49,184

[22] Filed: May 13, 1987

[30] Foreign Application Priority Data

May 19, 1986 [JP] Japan .......................... 61-73957[U]

[51] Int. Cl.⁴ ...................... F16H 55/17; F16B 37/08
[52] U.S. Cl. ........................... 74/459; 180/146; 411/432
[58] Field of Search .............. 411/427, 428, 432, 433, 411/436, 941.3; 180/146, 147; 91/380; 74/459

[56] References Cited

U.S. PATENT DOCUMENTS

| 2,917,938 | 12/1959 | Folkerts | 180/147 |
| 2,938,399 | 5/1960 | Briggs | 180/146 |
| 3,070,072 | 12/1962 | Folkerts | 180/146 |
| 3,261,224 | 7/1966 | Anthony . | |

FOREIGN PATENT DOCUMENTS

| 2908438 | 9/1979 | Fed. Rep. of Germany . |
| A43171G | 8/1981 | Fed. Rep. of Germany . |
| 1545457 | 11/1967 | France . |
| 48-33489 | 10/1973 | Japan . |
| 56-120851 | 9/1981 | Japan . |
| 56-147954 | 11/1981 | Japan . |
| 58-113654 | 7/1983 | Japan . |
| 58-118361 | 7/1983 | Japan . |
| 59-93557 | 5/1984 | Japan . |
| 59-131059 | 7/1984 | Japan . |
| 638029 | 5/1950 | United Kingdom . |
| 873093 | 7/1961 | United Kingdom ................. 91/380 |
| 1094350 | 12/1967 | United Kingdom . |

Primary Examiner—Neill R. Wilson
Attorney, Agent, or Firm—Armstrong, Nikaido, Marmelstein & Kubovcik

[57] ABSTRACT

A ball screw comprising a screw stem having on its outer periphery a helical rolling groove and a nut having on its inner periphery a helical rolling groove, and a deflector mounted on the nut and having ball returning grooves for returning a ball rolling between the rolling grooves in the screw stem and nut to between the original rolling grooves, thereby forming endless circulating passageways. The nut has a fitting groove open to at least one of both the open ends of the nut and is formed narrowing form its bottom toward its radial open end. Fitted into the fitting groove is a deflector having ball returning grooves corresponding in number to the endless circulating passageways to be formed. The deflector can be fixed accurately and firmly using axial fixing means fixed to an open end of the nut.

5 Claims, 5 Drawing Sheets

BALL SCREW HAVING AN AXIALLY EXTENDING BALL DEFLECTOR

FIELD OF THE INVENTION AND RELATED ARTS STATEMENT

This invention relates to a screw and more particularly to a ball screw in which a multiplicity of balls are inserted between rolling grooves formed in a screw stem and a nut engaged therewith so as to permit relative rotation and axial movement of the screw stem and nut by means of the balls.

A ball screw of this type permits a relative rotation and axial movement of a screw stem and a nut thereof by a rolling motion of a multiplicity of balls inserted between rolling grooves formed in the screw stem and nut instead of conventional sliding motion. This highly reduces the frictional resistance and saves the power as well as permits smooth rotation and axial movement to thereby provide high speed operation, so that these ball screws are often used in feed gears for cutting tools and/or work tables.

In a ball screw of this type, it is necessary to form an endless circulating passageway between the rolling grooves in the screw stem and nut in order to permit a relative rotation and axial movement of the screw stem and nut irrespective of the length of the screw stem. To this end, provided within the nut is a deflector having a ball returning groove through which balls can return again to their original rolling grooves by passing over a one-lead thread.

In order to fix the deflector to the nut, there is a known method in which, as shown in FIG. 8, holes 22 are formed in the inner surface of nut 20, and deflectors 21 are inserted and glued firmly in the holes (Laid-Open Pat. Application No. 131,059/1984). Another method is that, as shown in FIG. 9, an axial groove 23 is formed on the inner peripheral surface of nut 20 and deflector 21 inserted in the groove 23 with the deflector including a pair of pieces 24 fixed to the nut ends and movable pieces 25 held between the pair of fixed pieces 24 so that the movable pieces 25 can move slightly axially and radially between the fixed pieces and between nut 20 and the screw stem, not shown (utility model publication No. 33,489/1973).

In the former method shown in FIG. 8, since holes 22 are provided from the outer peripheral surface of nut 20 and deflectors 21 are inserted and fixed in holes 22, however, it is difficult to align rolling groove 26 formed in the inner surface of nut 20 and ball returning groove 27 formed in the inner surfaces of deflectors 21 with high accuracy in axial, radial and rotating directions. Thus ruggedness may be formed between rolling groove 26 and ball returning grooves 27 due to their positional deviation to thereby hinder smooth ball rolling. In addition, means fixing deflectors 21 to nut 20 may loosen due to vibrations occurring during use and/or changes in temperature. These may become large causes which will produce noise and/or impair the durability of the screw. Furthermore, means is required to maintain the space between holes 22 and the corresponding fitted deflectors 21 completely airtight.

In the latter method shown in FIG. 9, deflector 21 is divided into many pieces; namely, the pair of fixed pieces 24 and the movable pieces 25. It is difficult to manufacture deflector 21 with high precision because of accumulation of errors involved in manufacturing fixed and movable pieces 24 and 25. This method is slightly improved compared to the former method, but still has the problem that the manufacturing and assembling of the screw is difficult. According to this method, the positional deviation between rolling groove 26 in nut 20 and ball returning grooves 27 in deflectors 21 can be corrected because the respective movable pieces 25 are held movable axially and radially between the pair of fixed pieces 24, nut 20 and the screw stem, not shown. However, the respective movable pieces 25 are moved in a sliding manner, so that when the screw stem is forwardly and backwardly rotated relative to nut 20, the followability of the screw stem to a change of the direction in which the screw stem rotates is low. Especially, when the rotating direction is required to be changed frequently, it is necessary to reverse the rotating direction of the screw stem before the deflector 21 move to an optimal position in a certain rotating direction to thereby increase resistance to rotation abnormally and/or to easily knock down or incline the movable pieces 25 themselves due to the presence of spacings between the respective movable pieces and the nut. Thus no smooth ball circulating passageway is formed, noise may be produced, and/or the durability of the screw may be impaired.

OBJECT AND SUMMARY OF THE INVENTION

This invention has been made in view of such prior art problems. It is therefore an object of this invention to provide a ball screw which eliminates the above problems and fixes the deflectors within the nut accurately, fixedly and easily.

This invention is a ball screw comprising:

a screws stem having on its outer periphery a helical groove along which balls roll;

a nut having on its inner periphery a helical groove along which the ball rolls and corresponding to the groove on the screw stem, the nut having an axially extending fitting groove on its inner peripheral surface which is open to at least one of the open ends of the nut, the fitting groove narrowing from its bottom side toward its radial open end;

a deflector fitted into the fitting groove in the nut and having a shape corresponding to that of fitting groove, the deflector having ball returning grooves on its inner surface for returning balls rolling between the grooves in the screws stem and nut to between the original grooves to form endless circulating passageways for the balls, the ball returning grooves formed on the deflector corresponding in number to the endless circulating passageways; and axial fixing means attached to an open end of the nut for fixing the deflector.

In this invention, it is necessary that a fitting groove into which the deflector fits should be open at at least one end to an open end of the nut so that the deflector having a shape corresponding to the groove can be inserted through the open nut end into the nut. Therefore, the groove should be formed extending substantially the overall axial length of the nut or otherwise it should include two radially displaced groove portions, one extending from one nut end to the axial midpoint of the nut and the other extending from the other nut end to the axial midpoint of the nut.

For the deflector, one or more ball returning grooves, corresponding to the number of endless circulating ball passageways to be formed on the ball screw, are formed on the inner surface of the deflector. Thus the deflector is inserted in the grooves formed in the nut to form a requisite number of endless circulating passageways. The material of the deflector may be either a metal or a synthetic resin, but the synthetic resin should be preferably used from the standpoint of preventing the occurrence of noise and fitting the deflector closely into the nut groove using its resiliency.

The axial fixing means for fixing one or both of the ends of the deflector may be one or both of seal members, check rings or other means such as bonds fixed to both open ends of the nut.

A method of fixing the deflector may be any means and is not limited. The deflector and the axial fixing means may be fixed simultaneously to the nut by opening both ends of the fitting grooves to the corresponding open ends of the nut, fixing the deflector inserted into the fitting grooves at both ends to the corresponding axial fixing means mounted to both the open ends of the nut by means of any suitable means such as screw camping, bonding or welding.

As described above, a ball screw according to this invention has a fitting groove within the nut, the fitting groove narrowing rom its bottom toward its radial open end. The deflector is inserted into the fitting groove, limited in radial movement and fixed by axial fixing means mounted at both the open ends of the nut. Therefore, the deflector, machined with high precision, can be fixed correctly and firmly by a small number of parts, so that a ball screw can be manufactured and/or assembled very easily. In addition, the problem of low followability to the inversion of the rotating direction is eliminated, so that the circulation of balls is very smooth. No noise will be produced during high speed rotation. The balls are circulated reasonably and their durability is improved.

DETAILED DESCRIPTION OF THE PREFERRED EMBODIMENTS

Figure 1:
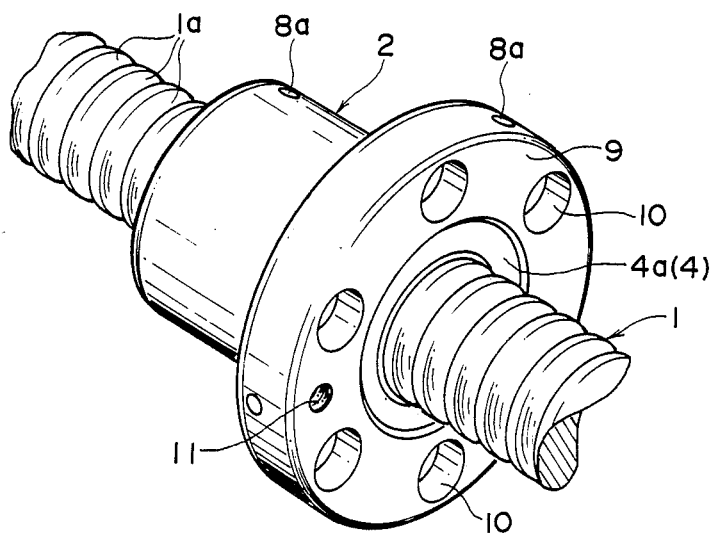
FIG. 1 is a perspective view of a ball screw according to an embodiment of this invention.
Figure 2:
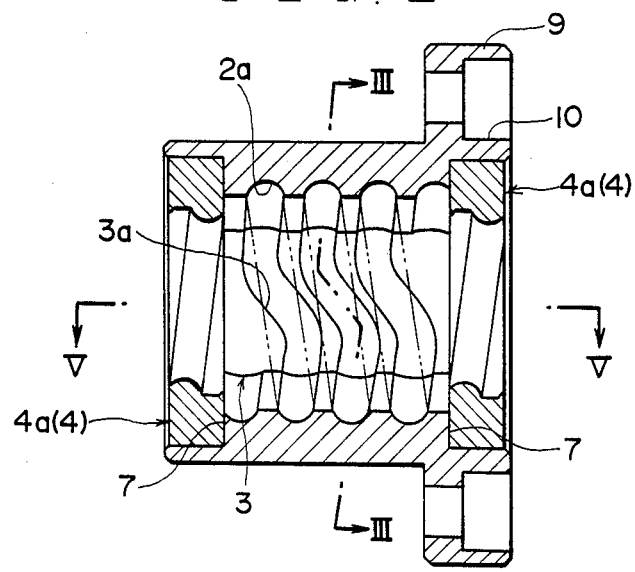
FIG. 2 is a longitudinal cross-sectional view taken in FIG. 1 the screw stem being omitted.
Figure 3:
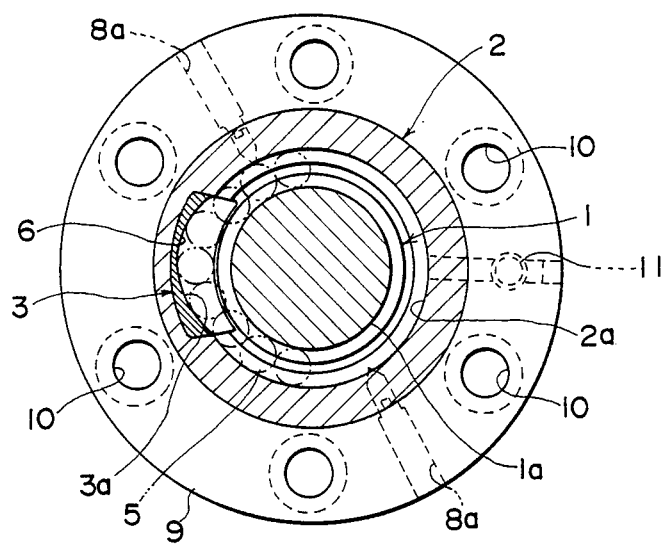
FIG. 3 is a cross-sectional view taken along the endless circulating passageway for the ball (along the line III—III of FIG. 2).
Figure 4:
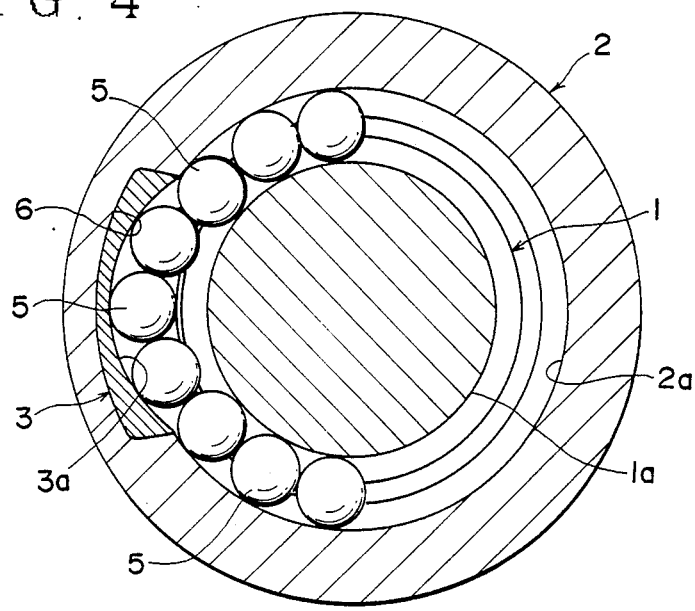
FIG. 4 is a partial cross-sectional view showing portion of FIG. 3 on enlarged scale.
Figure 5:
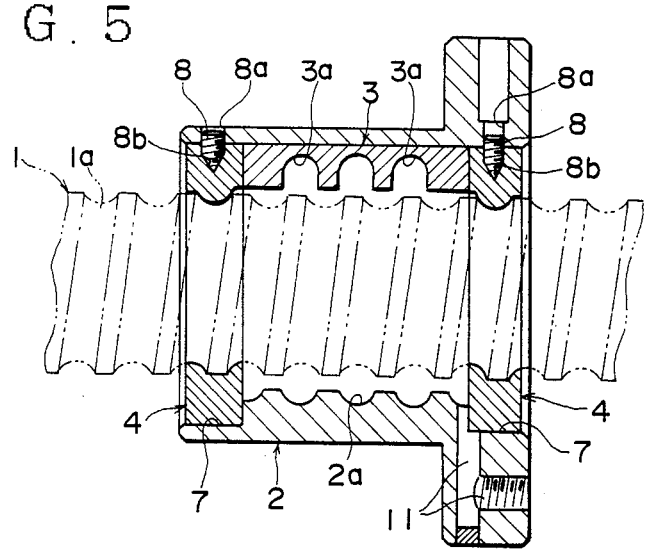
FIG. 5 is a cross-sectional view taken along the line V—V of FIG. 2.
Figure 6:
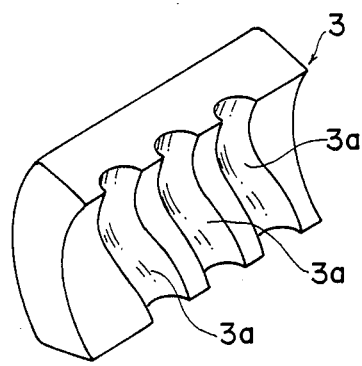
FIG. 6 is a perspective view of a deflector.

This invention will now be described in detail with reference to an embodiment thereof shown in the accompanying drawings.

FIGS. 1-6 show a ball screw according to an embodiment of this invention. This screw includes a screw stem 1 having a helical rolling groove 1a on its outer periphery along which groove balls 1 roll, and a nut 2 having a helical rolling groove 2a in its inner periphery and corresponding to the rolling groove 1a in screw stem 1. Nut 2 also has an axially extending groove 6 which narrows from its bottom to its radial open end. Fitted into groove 6 is a deflector 3 having a shape corresponding to that of groove 6 and having ball returning grooves 3a through which balls 5, rolling between grooves 1a and 2a of screw stem 1 and nut 2, are returned to between the original grooves 1a and 2a. Grooves 1a, 2a and 3a form endless circulating passageways for balls 5. The ball screw also includes axial fixing means 4 which comprises a seal member 4a which is attached to each open end of nut 2 and which prevents entrance of foreign matter from the outside into the nut 2 and also leakage of grease and lubricant fed to between nut 2 and screw 1.

In this embodiment, nut 2 has a mounting step 7 at each open end thereof into which step the annular seal member 4a is fitted and fixed by tap screws 8 which are screwed through threaded holes 8a in the step 7. Nut 2 has a flange 9 at one end to assemble the nut to another mechanical fixture. Flange 9 has holes 10 through which fixing bolts are inserted and also has a grease hole 11 through which grease or lubricant is fed into the space between nut 2 and screw stem 1.

Deflector 3 fitted into groove 6 in nut 2 has three ball returning grooves 3a through which balls which have rolled for about one lead between grooves 1a and 2a in stem 1 and nut 2 are returned to between the original grooves 1a and 2a to thereby form three endless circulating passageways between stem 1 and nut 2. In this embodiment, deflector 3 is made of a synthetic resin so that deflector 3 can be fitted into groove 6 in nut 2 in an airtight manner using the resiliency of deflector 3 itself. Since deflector 3 is made of a synthetic resin, little noise will be produced although the direction in which balls 5 move may change so that the balls hit upon each other and especially even in if the ball screw may be used in a condition of high speed rotation.

Seal member 4a fitted into step 7 formed at each open end of nut 2 and fixed by tap screws 8 is made, for example, of Teflon or nylon and takes the form of a ring, the inner peripheral surface of which is formed so as to correspond to the outer peripheral surface of screw stem 1 which extends through the ring. Seal member 4a also has threaded holes 8b on its outer periphery into which holes 8b the tap screws 8 are screwed.

In this embodiment, when a ball screw is to be assembled from screw stem 1, nut 2, deflector 3, the pair of seal member 4a and a multiplicity of balls 5, deflector 3 made of synthetic resin is fitted into groove 6 in nut 2 using the resiliency of deflector 3. Screw stem 1 is then inserted into nut 2 from one open end thereof to near end of deflector 3. Balls 5 are then inserted through an open end of the endless circulating passageways formed by rolling groove 1a and 2a of stem 1 and nut 2 thereinto. In this way, balls 5 are inserted into each endless circulating passageway. Screw stem 1 is then rotated forwardly and backwardly relative to nut 2 to position the deflector 3 in position. Seal member 4a is then fitted into each of the open nut ends, tap screws 8 are then inserted into holes 8a formed in the step 7 in the nut to screw the screw 8 into threaded hole 8b in seam member 4a to fix same to the nut to thereby fix same in position in the nut.

Figure 7:
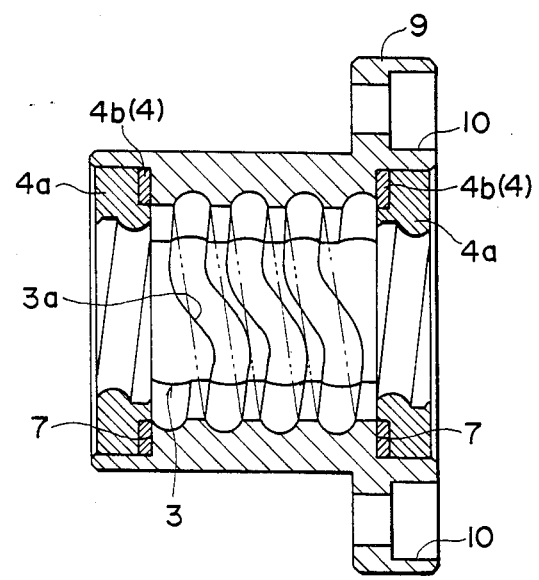
FIG. 7 is a view similar to FIG. 2 showing a ball screw according to another embodiment of this invention.
Figure 8:
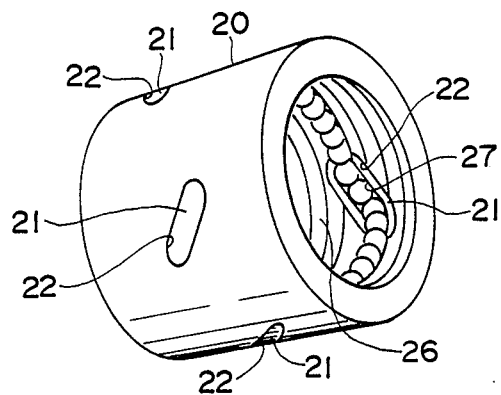
FIGS. 8 and 9 are perspective and lengthwise cross-sectional views, respectively, of a nut showing a deflector mounted to a conventional ball screw.
Figure 9:
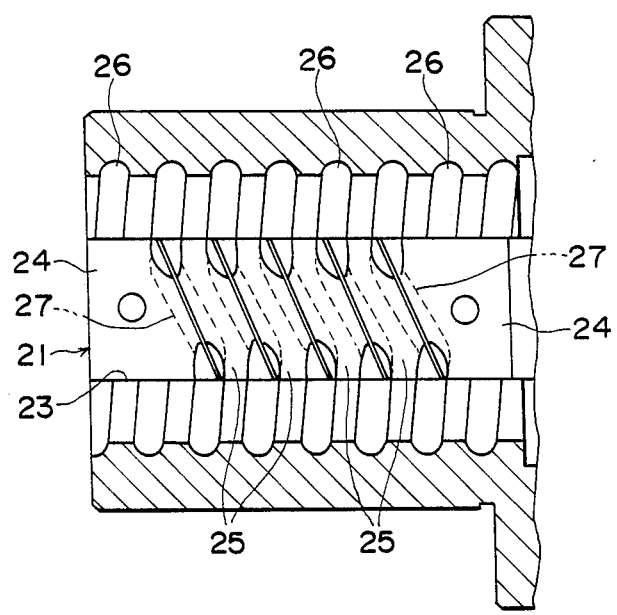

FIG. 7 shows another embodiment of a ball screw according to this invention. This embodiment is different from above embodiment in that the axial fixing means 4 for deflector 3 includes a check ring 4b fixed as by spot welding to each of the open ends of the nut.

In the above embodiments, the axial fixing means is fixed to each of the open ends of the nut. The respective axial fixing means and the deflector may be made of materials weldable to each other, for example, of metals or synthetic resins having the same material quality, and the respective axial fixing means and the deflector are fixed so as to have a fixed positional relationship by suitable means such as screw cramping, bonding or welding so that the deflector and the axial fixing means are fixed simultaneously on the nut side.

What is claimed is:

1. A ball screw comprising:

a screw stem having on its outer periphery a helical groove along which balls roll;

a nut having on its inner periphery a helical groove along which the ball rolls and corresponding to the groove on the screw stem, the nut having an axially extending fitting groove on its inner peripheral surface which is open to at least one of the open ends of the nut, the fitting groove narrowing from its radially outward side toward its radially inward open end;

a deflector fitted into the fitting groove in the nut and having a shape corresponding to that of fitting groove, the deflector having ball returning grooves on its inner surface for returning balls rolling between the grooves in the screw stem and nut to between the original grooves to form endless circulating passageways for the balls the ball returning grooves formed on the deflector corresponding in number to the endless circulating passageways; and axial fixing means attached to opposing ends of the nut for fixing the deflector in said nut.

2. A ball screw of claim 1, wherein the axial fixing means includes one or both of two seal members, one attached to each of the opposing ends of the nut.

3. A ball screw of claim 1, wherein the axial fixing means includes a check ring attached to at least one of the opposing ends of the nut.

4. A ball screw of claim 1, wherein the deflector is made of a synthetic resin.

5. A ball screw of claim 1, wherein the fitting groove is open at each end of the nut, and wherein the deflector is fixed at each end to said axial fixing means.

* * * * *